United States Patent [19]
Benveniste

[11] Patent Number: 5,809,423
[45] Date of Patent: Sep. 15, 1998

[54] ADAPTIVE-DYNAMIC CHANNEL ASSIGNMENT ORGANIZATION SYSTEM AND METHOD

[75] Inventor: Mathilde Benveniste, South Orange, N.J.

[73] Assignee: Lucent Technologies, Inc., Murray Hill, N.J.

[21] Appl. No.: 634,320

[22] Filed: Apr. 18, 1996

Related U.S. Application Data

[63] Continuation-in-part of Ser. No. 401,387, Mar. 9, 1995.
[51] Int. Cl.⁶ ..................................................... H04Q 7/20
[52] U.S. Cl. .......................... 455/452; 455/464; 455/67.1
[58] Field of Search ................................. 455/33.1, 33.2, 455/33.4, 34.1, 53.1, 54.1, 62, 63, 67.1, 67.2, 450, 451, 452, 453, 464, 561; 379/59, 60

[56] References Cited

U.S. PATENT DOCUMENTS

| | | | |
|---|---|---|---|
| 5,134,709 | 7/1992 | Bi et al. | 455/33.1 |
| 5,404,574 | 4/1995 | Benveniste | 455/33.1 |
| 5,437,054 | 7/1995 | Rappaport et al. | 455/33.1 |
| 5,475,868 | 12/1995 | Duque-Anton et al. | 455/62 |

*Primary Examiner*—Reinhard J. Eisenzopf
*Assistant Examiner*—Darnell R. Armstrong

[57] ABSTRACT

A channel assignment system allocates channels to various cells by the optimal partitioning of the available radio frequencies into non-overlapping sets, the optimal grouping of co-user cells, and the best allocation of the former to the latter. Maximization of traffic handling capacity is, for one embodiment, expressed as the maximization of a bottleneck capacity ratio, known as the capacity factor. The capacity ratio for a cell is defined as the ratio of the number of radio frequencies allocated to the cell over the number of radio frequencies needed to meet blocking probability requirements. Given a channel allocation, the latter is fixed once the traffic loads and desired blocking are specified. The solution to attain an optimal non-regular channel assignment is decomposed into two mathematical programs designated a Master Program and a Subprogram. These are solved iteratively with assistance from a channel set augmentation technique implemented between solutions of the Master and Subprogram. A method is also provided for periodic reallocation of channels to cells to address changing capacity requirements in individual cells. A further methodology is provided where a cell, having exhausted its available allocated channels, may "borrow" channels, i.e., it may use channels that are not allocated to the cell.

7 Claims, 9 Drawing Sheets

ADAPTIVE-DYNAMIC CHANNEL ASSIGNMENT ORGANIZATION SYSTEM AND METHOD

This is a continuation in part of Ser. No. 08/401,387, filed Mar. 9, 1995.

FIELD OF THE INVENTION

This invention relates to wireless/cellular radiotelephone systems and an apparatus and method for the allocation of radio frequency (RF) spectrum channels to the different cells within a wireless telecommunications system for optimizing utilization of the available overall radio spectrum.

BACKGROUND OF THE INVENTION

The service area of a wireless communications system is partitioned into connected service domains known as cells, where radio telephone users communicate, via radio links, with the base station serving the cell. The base station (BS) is coupled to the land network. Efficient use of the available radio frequency spectrum is achieved through the reuse of the same radio frequencies in designated co-user cells that are sufficiently separated by distance so that the combined interference generated by all co-user cells is below tolerable levels. The assignment of radio frequencies to cells has been based on regularity assumptions (i.e., equal-sized regularly-spaced cells with uniformly distributed traffic loads), which enable the adoption of simple rules for identifying co-user cells, and for partitioning the RF spectrum into channel sets. When the regularity assumptions do not hold—as is frequently the case in real world situations—the rules of regular channel assignment do not lead necessarily to the efficient utilization of the RF spectrum, if they can be applied at all. Accordingly, a channel assignment approach, known as non-regular channel assignment, has evolved for optimal utilization of the RF spectrum, which requires a solution of the non-regular channel assignment problem. Both regular and non-regular channel assignment approaches belong to class known as fixed channel assignment, which is characterized by a fixed relationship between cells and the channels serving them. Only the channels allocated to a cell can serve calls in that cell, and each channel can be used simultaneously by all the cells to which the channel is assigned. Additionally, a new classification has been developed known as flexible channel assignment. Such flexible channel assignment methods, exploit the capability of a system for remote, software-driven, retuning of the base station radios, which capability enables channel capacity to adapt to traffic variation. Thus, broadly speaking, channel assignment approaches in cellular systems can be classified into two categories: fixed and flexible.

Fixed channel assignment, as noted, includes both regular channel assignment, which is optimal for a system with traffic distributed uniformly across cells, and non-regular channel assignment, which will be applied when the traffic distribution is not uniform. An optimal non-regular channel allocation methodology allocates channels to cells according to their traffic load. Such an optimal non-regular channel assignment will outperform regular channel assignment.

Flexible channel assignment methods, on the other hand, exploit the capability of a system for remote, software-driven, retuning of the base station radios, which capability enables channel capacity to adapt to traffic variation. The concern here is with short-term variations. One example of such short-term variation is the variation due to the random nature of calls, which causes the number of calls in different cells to be different even though their average over time remains constant. The other variation of interest is due to a trend change; that is, a change in the average number of calls per cell. Such a change may occur either expectedly (sometimes repeating regularly, as during the daily rush hour) or unexpectedly.

SUMMARY OF INVENTION

Therefore a channel assignment system, embodying the principles of the invention, allocates channels to various cells by the optimal partitioning of the available radio frequencies into non-overlapping sets, the optimal grouping of co-user cells, and the best allocation of the former to the latter. An objective is the maximization of traffic handling capacity which, given the multitude of cells, is, for one embodiment, expressed as the maximization of a bottleneck capacity ratio, known as the capacity factor. A capacity ratio for a cell is defined as the ratio of the number of radio frequencies allocated to the cell over the number of radio frequencies needed to meet blocking probability requirements. Given a channel allocation, the latter is fixed once the traffic loads and desired blocking are specified.

Given a group of cells of arbitrary shape, size, and/or location, the available RF spectrum is partitioned into optimal channel sets, and these channel sets are allocated to cells in an optimum way. Since traffic loads may vary from cell to cell, the allocation objective is the maximization of the cells' combined traffic-handling capacity. This objective can be expressed as the maximization of the bottleneck capacity ratio that can be sustained at a satisfactory blocking rate and interference level, which is the lowest capacity ratio across all cells.

In another embodiment, a method is provided for periodic reallocation of channels to cells to address changing capacity requirements in individual cells.

In a still further embodiment, a cell having exhausted its available allocated channels may "borrow" channels, i.e., it may use channels that are not allocated to the cell.

DETAILED DESCRIPTION

A conventional regular hexagonal cell layout, of a cellular radiotelephone system, is shown in schematic form in FIG.

Figure 1:
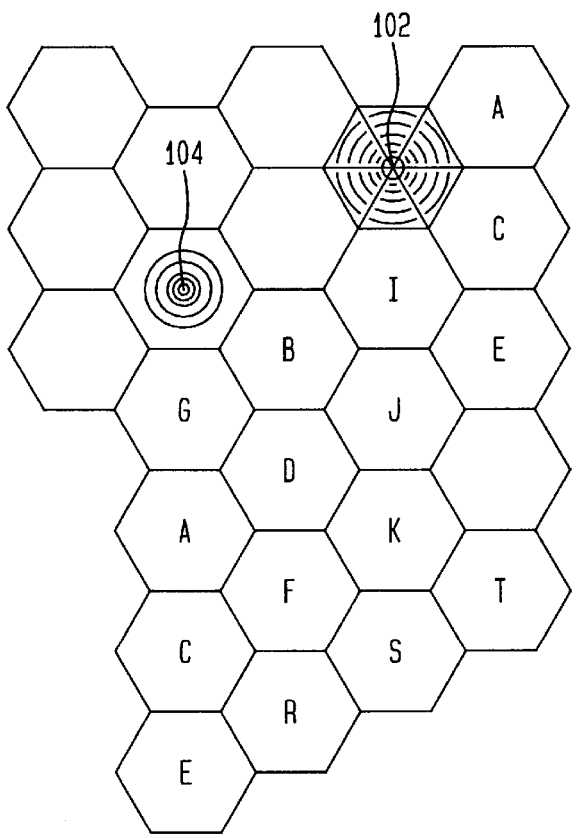
FIG. 1 is a schematic of a regular cell area layout of a wireless/cellular radiotelephone system.

1. Depicting the geographical service area in terms of a hexagonal grid sets a geometric pattern that allows frequencies to be allocated in a patterned disposition that allows the reuse of these frequencies in a controlled repeatable regular assignment model that satisfies interference restrictions. The cell areas each have specific channel sets allocated to them. Each channel set comprises a plurality of individual transmit and receive radio channels for use within the cell area. In this model, shown in FIG. 1, cells marked "A" are co-user cells and all use the same channel set. The same is true for co-user cells marked "B", "C", etc., each of which have their own allocated channel set.

Each cell is radiated by an antenna system associated with a base station (BS), that includes the radio transceivers and which are in turn connected to the public switched telephone network (PSTN) via trunk lines or suitable equivalent. Antennas 101 are either omni-directional or directional. Directional antennas 102 are used to sectorize cells into smaller angular wedge type serving areas.

Figure 2:
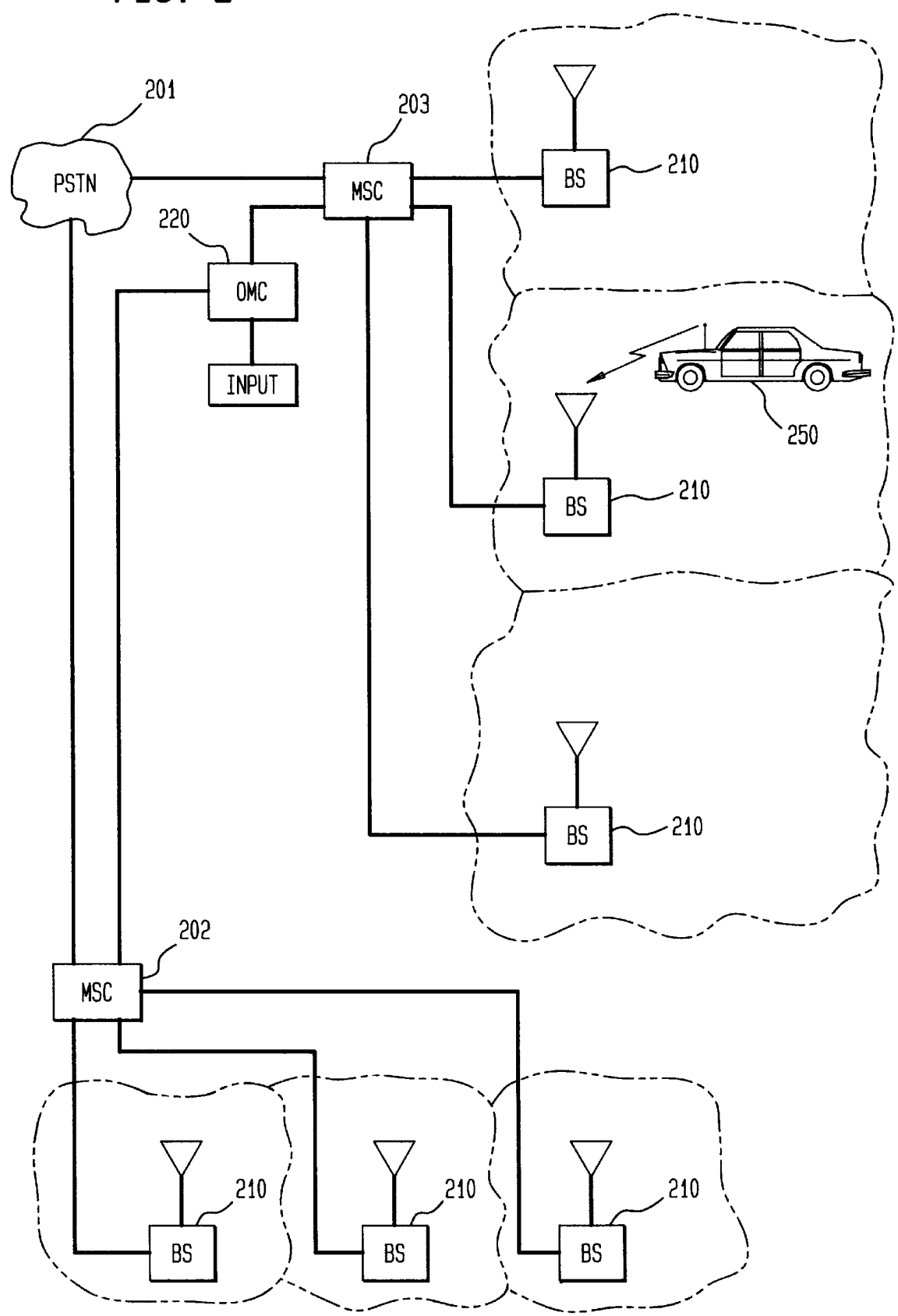
FIG. 2 is a block schematic of a wireless/cellular radiotelephone system.

A typical cellular system is shown in the block diagram of FIG. 2. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radiotelephones 250 within its cell coverage area.

An operations and management center (OMC) 220 is coupled to the MSCs 202 and 203 to control their system operation and their associated BSs 210. OMC 220 is a central control station which includes data processing equipment and input for accepting data input from data storage and real time control. This data processing arrangement may be utilized in implementing channel assignments in combination with remotely tunable radio transceivers located at the BSs.

Figure 3:
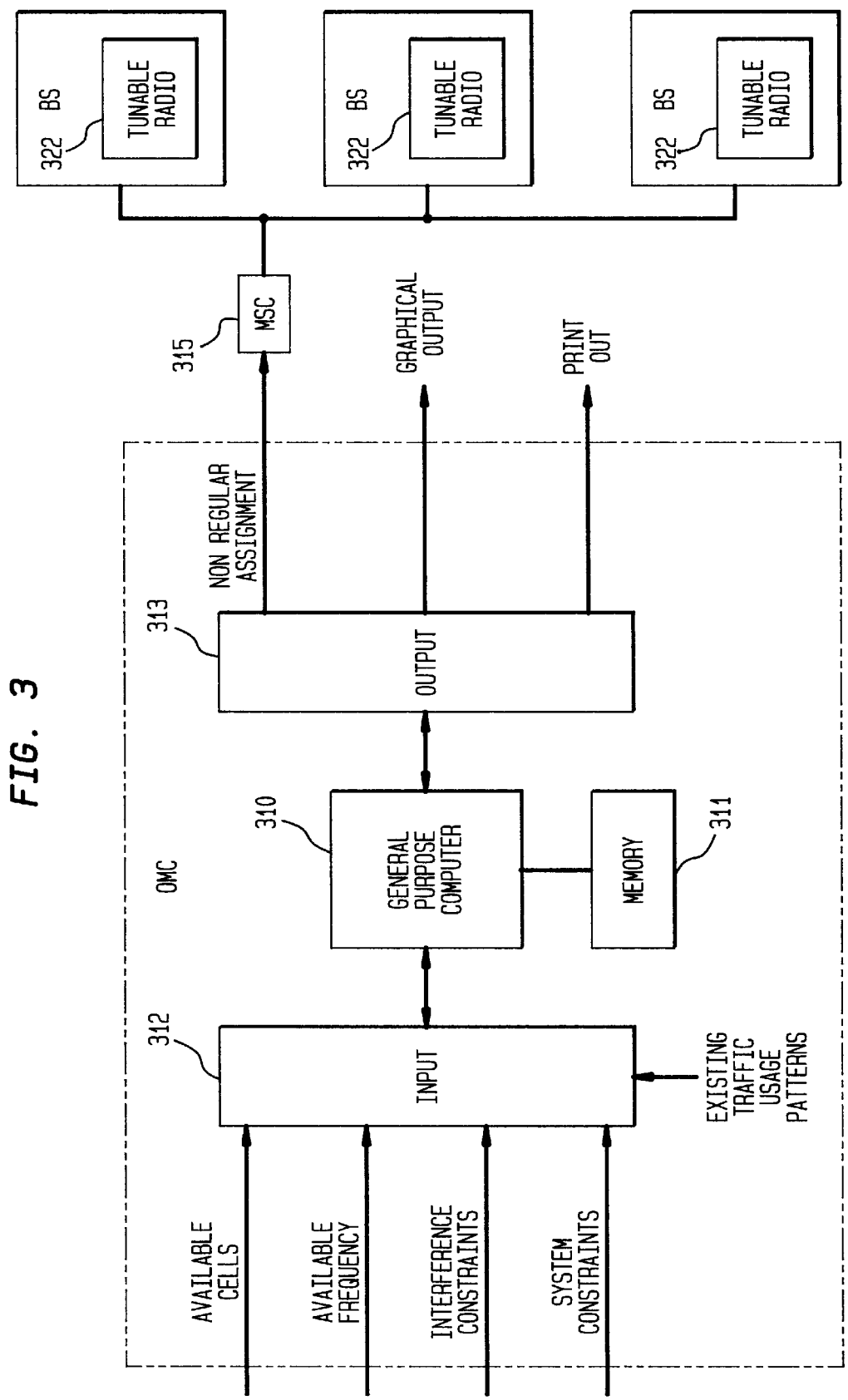
FIG. 3 is a block schematic of a data processing system for allocating radio channels to various cells of a wireless/cellular radiotelephone system.

An illustrative embodiment of data processing equipment included in the OMC for controlling the assignment and tuning of radio transceivers at the BSs is shown in block schematic form in the FIG. 3. A general purpose computer 310 has a stored program included in its memory 311. This program includes instructions for performing the assignment of radio channels to a cellular system as disclosed in further detail below. Initial input data is supplied through the input circuit 312 to the computer 310. Inputs include the available cells. The available radio frequencies are also input into the computer 310. Further inputs include interference information usually in the form of a cell-to-cell interference matrix, which defines the interference to each cell from every other cell. The inputs also include system constraints necessary for the desired channel assignment. Traffic usage patterns are supplied as an input. Traffic may be measured in real time.

In this illustrative embodiment of the invention, the assignment process is performed in the computer 310 according to the instructions contained in memory 311. The resulting channel assignment is output via the output 313 to the MSC 315 and is in turn forwarded to the BSs 321. The individual tunable radios 322 included in the BSs are tuned to the proper frequencies in accord with the assignment of radio channels determined by the assignment process. Added output leads permit graphical and data printouts at the OMC.

As shown in detail below, once channels have been allocated to cells based on an expected traffic distribution, available unused channels not allocated to a particular cell can be borrowed by a cell if it has a present need for added channel capacity.

In practice, each cell will exhaust its allocated channels first before requesting an additional borrowed channel. If, however, it needs additional channels, it may borrow unused additional channels not allocated to the cell, provided that system and interference constraints are not violated. This borrowed channel is released by the using cell as soon as one of the cell's allocated channels becomes available (due to a call termination or a hand-off). If channel rearrangement is not desirable at this point, the borrowed channel is released upon termination or hand-off of the call it serves.

I. Channel Assignment Criteria

Flexible channel assignment methodology comprises three categories: adaptive, dynamic, and adaptive-dynamic channel assignment, the last category being the hybrid of the first two. As a preface to a discussion of differences among these three flexible channel assignment categories, a brief discussion of some of the criteria that guided the development of the channel assignment algorithm disclosed herein is warranted. Those criteria are:

Number of cell sites
Neighbor-channel interference
Number of channel re-arrangements and each is considered under the appropriate heading below.

A. Number of Cell Sites

The ultimate goal in selecting a channel assignment algorithm is to minimize the number of cell sites needed to cover a given area. That is, the blocking and call-drop probability and the signal-to-interference (S/I) ratio or bit-error-rate (BER) requirements must be met by installing as few cell sites as possible. When this is accomplished, traffic demand is met at the lowest cost possible.

In the simple scenario whereby traffic is distributed uniformly across the cells, a surrogate criterion for cell-site minimization would be to maximize call throughput. Another would be the maximization of the number of calls (radios) that can be active simultaneously. But when call traffic is not distributed uniformly and, moreover, when it varies in time, call throughput maximization is no longer an adequate surrogate criterion. Instead, the measure of merit of a channel assignment algorithm should reflect the ability of the algorithm to adapt to spatial and temporal variation in the traffic distribution, in order to ensure the lowest requirement in the number of cell sites.

B. Neighbor-Channel Interference

The quality of communication in wireless systems depends on the ratio of the received signal to interference. Interference consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. In regular channel assignment, where three-sector cells re-use the spectrum in clusters of 7 cells, the spacing of 21 channels between channels serving the same cell has been more than adequate to render negligible any interference from neighbor channels. But as flexible channel assignment approaches are pursued, attention must be paid to the spectrum separation between channels used simultaneously in the same cell, or in neighboring cells, and to the impact of power control. Various methodologies for addressing neighbor-channel interference, including novel power control techniques, are disclosed by the inventor in the following pending applications: U.S. Patent application Ser. No. 08/580,570, entitled "System and Method For Managing Neighbor Channel Interference In Channelized Cellular Systems" (M. BENVENISTE-7); U.S. Patent application Ser. No. 08/580,568, entitled "System and Method For Management of Neighbor Channel Interference With Cellular Reuse Partitioning", (M. BENVENISTE-8); and U.S. Patent application Ser. No. 08/581,694, entitled "System and Method For Management of Neighbor Channel Interference With Power Control and Directed Channel Assignment", (M. BENVENISTE-9).

C. Channel Re-arrangements

In addition to maintaining a certain S/I ratio, one must ascertain that any transmission interruptions that may occur are not annoying to the user. Typically, short transmission interruptions occur during hand-offs, when the mobile radio transmitter must be turned off before retuning. [See, TIA/EIA Interim Standard, "Cellular System Dual-Mode Mobile Station—Base Station Compatibility Standard", IS-54-B, April 1992; and TIA/EIA Interim Standard, "800 MHz TDMA Cellular—Radio Interface—Mobile Station Compatibility—Digital Control Channel", IS-136.1, December 1994.] The result is a mute gap that is sufficiently short not to be annoying to the user.

Similar mute gaps will arise in flexible channel assignment during channel re-arrangements. A channel re-arrangement involves the change of the channel of a call while still served by the same cell site or sector. Exemplary of such a channel rearrangement is the release of a borrowed channel, as described herein before, where upon vacation of one of a cells allocated channels, a call in that cell using a borrowed channel may be transferred (re-arranged) to the vacated owned channel, with the borrowed channel being released back to its owning cell. On the base station side, channel re-arrangements can be performed by retuning the cell-site radio that serves the call (after dispensing, of course, with the one-to-one correspondence between radios and frequencies). On the mobile side, a channel re-arrangement is equivalent to an intra-cell hand-off, and must comply with the constraints imposed by the present air-interface standards, IS 54 and IS 136. [id.]

The mobile air-interface standards specifications affect the minimum time spacing allowed between successive channel re-arrangements. First, a channel re-arrangement must be complete before another is requested. This imposes a limit of about 3 to 5 seconds between consecutive channel re-arrangements. Secondly, the mute gaps associated with retuning the mobile radio, though not annoying to the user when adequately spaced, may become so at a shorter spacing. There exist no known empirical studies on the issue of the minimum allowable spacing between consecutive mute gaps. It is believed, however, that mute gaps should be at least 15 seconds apart.

Because of the above restrictions, the number of channel re-arrangements that can be executed by a dynamic channel assignment algorithm is limited. To illustrate the relationship between the two, consider the combination of cell size and mobile speed that would cause a call to be handed-off twice in T seconds. Consider further that the minimum desirable spacing between consecutive channel re-arrangements were t seconds, and that channel re-arrangements occur randomly, as a Poisson process, with rate $\lambda$. ($\lambda$ will depend on the cell size, mobile speed, and the particular channel assignment algorithm employed.) Then the probability p that a call will experience two channel changes t seconds apart or less, while still covered by the same cell, is given by the following.

$$p = p_a + p_b - p_a p_b \tag{1}$$

where, if T>2t $$p_a = 1 - e^{(-2\lambda t)} \text{ and} \tag{2}$$

$$p_b = 1 - \sum_{n=0}^{q-1} \frac{e^{(-\lambda t)}(\lambda t)^n}{n!} + \sum_{n=2}^{q-1} \frac{e^{(-\lambda t)}(\lambda t)^n}{n!} (1 - e^{(-\lambda t)}) \tag{3}$$

where q is given by the expression:

$$q = \left[ \text{smallest integer} \geq \frac{T}{t} \right] - 1 \tag{4}$$

Otherwise, $p_b$ is 0 and $$p_a = 1 - e^{(-\lambda T)} \tag{5}$$

As an example consider a time interval T equal to 60 seconds (as, e.g., when a mobile moves at 30 miles per hour in a half-mile cell). Assume that the average rate of channel re-arrangement (excluding hand-offs) is one every 60 seconds; that is, $\lambda$ is equal to 0.0167/second. Then if the minimum spacing permitted between consecutive channel changes is 5 seconds, the probability p of violating this restriction is 15 per cent, by equation (1). The same probability is 40 percent if a 15 second spacing is required between consecutive channel changes. If the call started in a contiguous cell, where it spent 30 seconds before it was handed over, the probability of violating a 5 and 15 second restriction between consecutive channel changes in that cell would have been 15 and 39 per cent, respectively, for the two spacing requirements considered in this example. The probability of violating the minimum spacing requirement in either of the two cells would be 28 and 63 per cent, respectively. Naturally, this probability decreases as the rate $\lambda$ of channel re-arrangements decreases. It is 3 and 8 per cent, respectively, for a $\lambda$ value of 0.0014/second; that is, when a channel re-arranges calls once every 12 minutes on the average.

As wireless systems evolve to using smaller cell sizes, and hand-offs increase in number as they are pushed closer together, it will become increasingly harder to allow random channel re-arrangements (except those associated with hand-offs). For this reason, the flexible channel assignment methodology of the invention has avoided reliance on random channel re-arrangements.

II. Adaptive Channel Assignment

An adaptive channel assignment ("ACA") algorithm adjusts channel assignments to traffic by recomputing the optimal non-regular channel allocation for different time periods, using observed data to estimate expected traffic loads. [See, M. Benveniste, "An Optimization Model for Non-Regular Assignment in Wireless Communications Networks", *AT&T Bell Laboratories Technical Memorandum* 54452-920601-01TM, Jun. 1, 1992] With ACA, a new channel allocation is recomputed when the traffic loads have changed in a statistically significant way to warrant recalculation. The time interval between successive channel re-allocations could range from half an hour to eight hours. Re-allocation will be triggered by a test that is equivalent to the rejection of the appropriate test of hypothesis. It provides the mechanism for adjusting to traffic trend variations. Adaptive channel assignment has no way of adjusting to traffic variations due to randomness.

The relationship between channels and cells is fixed within the time interval between consecutive channel re-allocations, much like in non-regular channel assignment. Since, as discussed above, non-regular channel assignment performs better than regular channel assignment, adaptive channel assignment will also do better.

III. Dynamic Channel Assignment

Another method for adjusting to the variable demand for channels is dynamic channel assignment. Dynamic channel assignment dispenses altogether with the fixed relationship between channels and cells. More users may access a channel than would be possible to serve simultaneously. [See, e.g., L. G. Anderson, "A Simulation Study of Some Dynamic Channel Assignment Algorithms in a High Capacity Mobile Telecommunications System", *IEE Trans. Commun.*, Vol. 21, No. 11, November 1973; R. Beck and H. Panzer, "Strategies for Handover and Dynamic Channel Allocation in Micro-Cellular Mobile Radio Systems", *Proc. IEEE Vehicular Technol. Conference*, May 1989; L. J. Cimini, Jr., G. J. Foschini, and C.-L. I, "Call Blocking Performance of Distributed Algorithms for Dynamic Channel Allocation in Microcells", *AT&T Bell Laboratories Technical Memorandum* 11344-911003-10TM, Oct. 3, 1991.] Because of its increased flexibility, a dynamic channel assignment algorithm can adjust to both randomly-induced variations in traffic and to trend changes.

With more users having access to a given channel, the channel's idle time can be reduced, but not always. As is known to those skilled in the art, however, all dynamic channel assignment algorithms do not guarantee a capacity improvement relative to regular channel assignment. [See, e.g., Beck and Panzer, "Strategies for Handover and Dynamic Channel Allocation in Micro-Cellular Mobile Radio Systems" id.] Because the collection of users assigned a channel at a given point in time depends on the dynamics of call arrivals and terminations, the average distance between them may be greater than the minimum separation allowed for interference control reasons. The decrease in capacity, caused by a greater re-use distance, would cancel the potential gains arising from the greater flexibility in channel use. The effect becomes more prominent at congestion when channels have less idle time. It is also more pronounced in systems with a larger number of channels [See, D. C. Cox and D. O. Reudink, "The Behaviour of Dynamic Channel Assignment Mobile Communications Systems as a Function of Number of Radio Channels", *IEEE Trans. Commun.*, Vol COM-20, Nov 1972, 471–479.] as the larger server groups (used in fixed channel assignment) utilize channels more efficiently.

IV. Adaptive-Dynamic Channel Assignment

As suggested above, adaptive channel assignment outperforms regular channel assignment consistently. But it cannot take advantage of channel idle-time reduction, achieved when the restrictions on channel access are relaxed. Dynamic channel assignment, on the other hand, allows flexibility on the use of channels by different cells, but capacity losses may result at congestion because of the longer average re-use distance realized. Adaptive-Dynamic Channel Assignment ("ADCA") combines the best of the two approaches: the consistent non-inferiority of adaptive channel assignment with the ability of dynamic channel assignment to reduce channel idle time.

ADCA is adaptive channel assignment using a special form of dynamic channel assignment, channel borrowing. In traditional channel borrowing, channels are allocated to cells by the rules of regular channel assignment. [See, Anderson, "A Simulation Study of Some Dynamic Channel Assignment Algorithms in a High Capacity Mobile Telecommunications System", id.; J. S. Engel and M. M. Peritsky, "Statistically-Optimum Dynamic Server Assignment in Systems with Interfering Servers", *IEEE Trans. Commun.*, Vol. 21, No. 11, November 1973.] Cells will attempt to use the allocated channels first. If unavailable, other channels will be accessed. A channel that is used by a cell other than its owner cell will be referred to as a borrowed channel. A channel will be used by a cell only if interference restrictions are satisfied.

The channel borrowing algorithm in ADCA differs from traditional channel borrowing in that the channel allocation is not regular. It is non-regular, just as in adaptive channel assignment. Because of channel borrowing, ADCA can adjust channel capacity to randomly-induced variations in traffic, as well as to traffic trend changes.

An illustration of this ADCA approach is presented in Section VII below, which describes application of channel borrowing (dynamic) to address changing capacity requirements in cells having non-regular channel allocations periodically re-determined (adaptive) by the optimum non-regular channel allocation methodology described in Section VIII below.

The reason for combining dynamic with adaptive channel assignment is to take advantage of the positive attributes of each approach. At the same time, care must be taken to avoid the weaknesses of both. Adaptive channel assignment, which cannot reduce channel idle time due to the random variation in traffic, can do so if combined with channel borrowing. Channel borrowing, which helps an adaptive-dynamic algorithm do better at moderate traffic loads, tends to decrease capacity at heavier loads. Proper measures are needed to prevent this capacity loss. To address this objective, two such measures are disclosed herein: channel reservation and channel re-arrangement. The two can be used together. However, because of the performance implications associated with channel re-arrangements (as discussed above under "Channel Re-arrangements"), it will be preferred that the latter be used with caution.

V. ADCA with Channel Reservation (ADCA-CR)

In this algorithm each cell reserves a number R of its allocated channels to be used exclusively for its own calls. This number may be different for different cells, and could be calculated in real time. The identity of the reserved channels is not specified, and there is no restriction on the order channels are considered for use, except that allocated channels must be considered first. Borrowing of any of the allocated channels is allowed so long as R of these channels are available for use by the owner cell. Once this ceases to be the case, the available allocated channels are used exclusively for calls in the owner cell.

Channel reservation does not impede borrowing in light traffic, but it does so at congestion, as channels tend to be used more by their owner cells. Hence, the ADCA algorithm converges to the purely adaptive algorithm.

A special case of the ADCA algorithm arises when R is set equal to the maximum possible value: the number of channels allocated to each cell. Because no borrowing can take place, this form of ADCA is equivalent in throughput to ACA. Hence, when stable channel assignments are desirable, this form of ADCA can be used as well as ACA. ADCA, however, is preferable to ACA from an implementation standpoint because, unlike ACA, ADCA eliminates the need for coordinating the channel re-arrangement of calls carried by channels whose status changes from "allotted" to "non-allotted" during a channel re-allocation. Active "non-allotted" channels are simply treated as "borrowed" channels until their calls terminate or are handed off.

VI. ADCA with Channel Re-arrangement (ADCA-RA)

Another way to achieve the convergence of the adaptive-dynamic algorithm to an adaptive algorithm is through channel re-arrangement. Since the objective is for each cell to use its allocated channels, a call on a borrowed channel may be transferred to an allocated channel as soon as one becomes available, much along the lines proposed for the ordinary channel borrowing algorithm [Engel & Peritsky, "Statistically-Optimum Dynamic Server Assignment in Systems with Interfering Servers", id.]. A channel re-arrangement would occur after a call termination, hand-off, or another channel re-arrangement.

Since channel re-arrangements come with a penalty (as explained above in Section I(c), "Channel Re-arrangements") the following safeguards can mitigate their adverse impact.

i. Restrict the number of channel re-arrangements per call in a cell.

ii. Limit the minimum time interval between consecutive channel re-arrangements on a call. The second measure is more robust. When restricting the number of channel re-arrangements, the cell size and mobile speed should be taken into account.

VII. ADCA Algorithm Logic

The ADCA algorithm disclosed herein can be described in terms of three basic functions: the Channel Acquisition Function, the Channel Release Function, and the Channel (Re-)Allocation Function. The first two are invoked upon arrival, termination, or hand-off of a call; or after a channel re-arrangement, if one is allowed by the algorithm. The third function is invoked when the channel allocation must be (re)computed.

Figure 4:
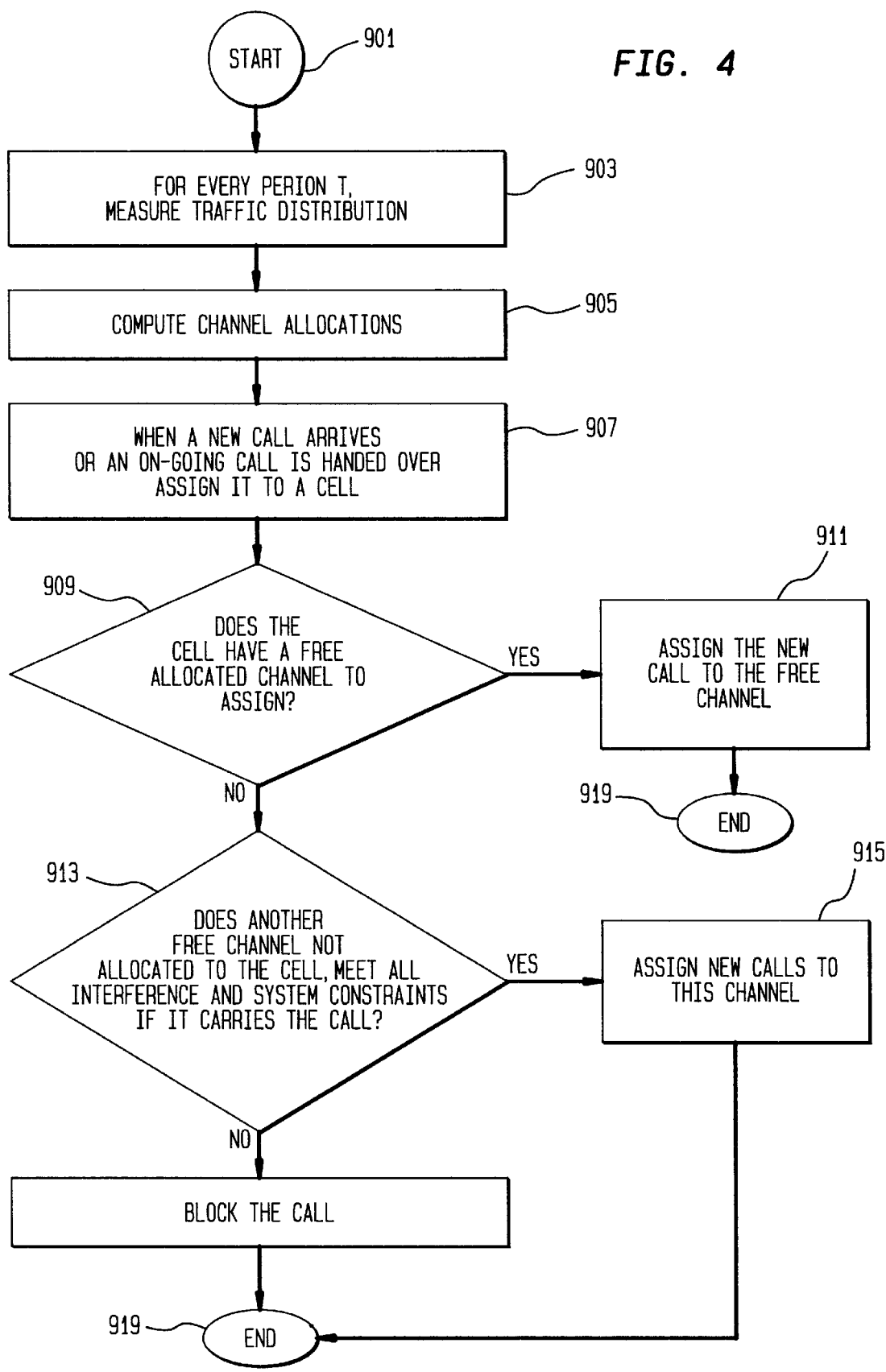
FIGS. 4 and 5 are flow charts disclosing a process for a cell "borrowing" non-allocated channels to meet demand for channels, and channel release.

The process in which unused channels are borrowed by a cell needing added capacity is illustrated by the flowchart of FIG. 4. The process begins at terminal 901 and in block 903 the instructions call for a periodic measurement of traffic distribution. The instructions of block 905, which comprises the channel reallocation function, replicate the computation described below for computing channel allocation, or any other method for computing channel allocations. The arrival of a channel request on one of the cells invokes the channel acquisition function. As shown in block 907, that channel request may find that cell fully subscribed. The decision block 909 determines if there is an available channel from those allocated to the cell to assign to the call request. If there is one, the flow proceeds to block 911 whose instructions assign the call to the free channel and the assignment process ends in terminal 919.

If all channels allocated to the cell are busy within the cell, or borrowed by other cells, the flow proceeds to block 913, which determines if there is a free channel, not allocated to the cell, that would meet all interference and system requirements if assigned to the call. If there is one, the flow proceeds to block 915, whose instructions assign the call to the free channel and the assignment process ends in terminal 919.

Figure 5:
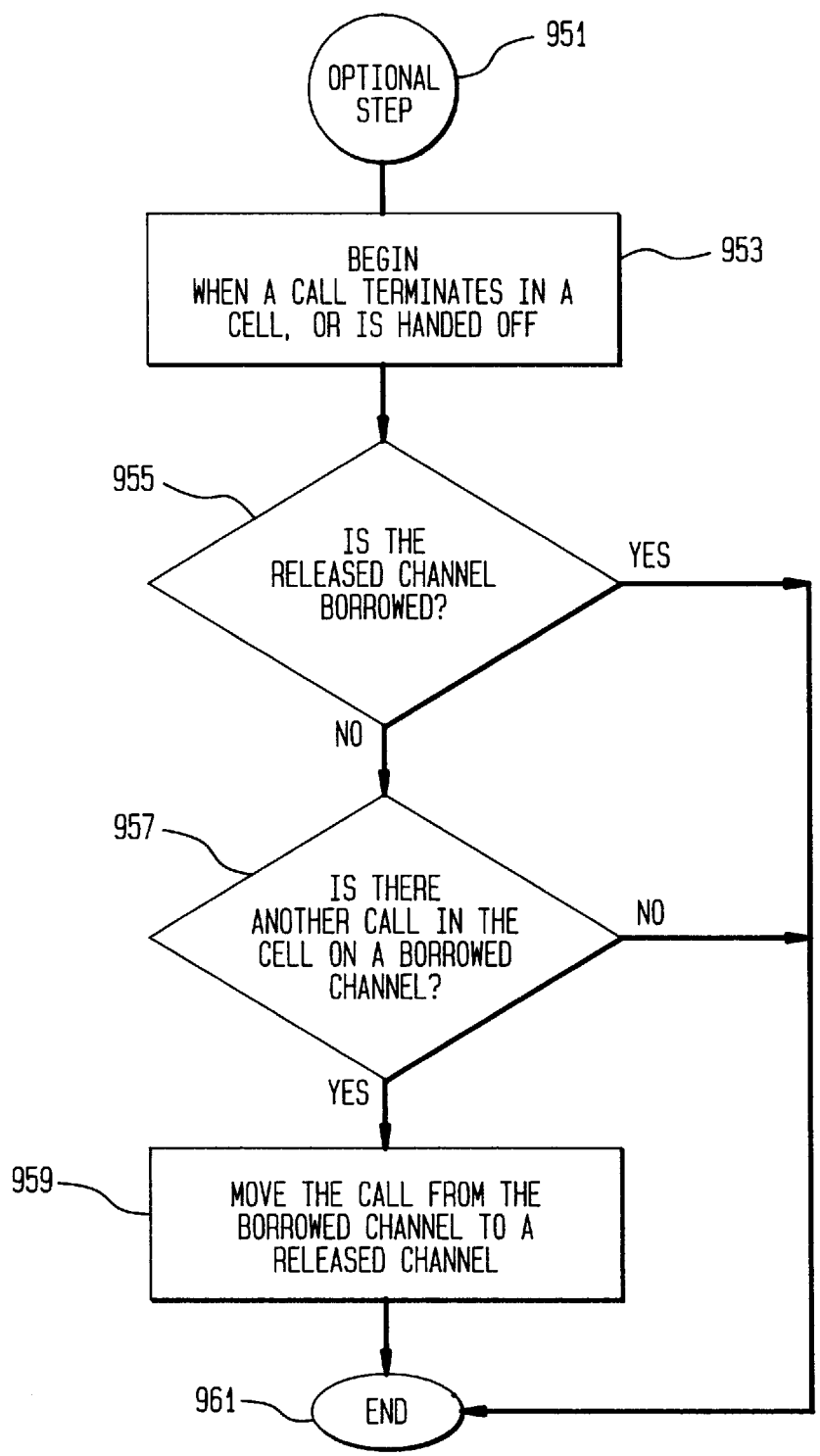

When a channel becomes available, the channel release function, illustrated in FIG. 5, controls the disposal of the borrowed channel. The process begins in start terminal 951 and in block 953 which recognizes the termination or handoff of a call. The instructions of decision block 955 inquire if the released channel is a borrowed channel. If it is, the flow terminates in the end terminal 961. If it is not, the decision block 957 inquires if there is another call in the cell using a borrowed channel. The flow ends in the absence of such a call. If a borrowed channel is being used, the call on that channel is transferred to the released channel as shown in block 959. The flow process terminates in the end terminal 961.

All functions employ the serving signal and interference statistics. These statistics are estimated from data collected by the system. Other information needed by the first two functions is the allocation status of channels for each cell, which is supplied by the third function. A channel will be considered allotted if it has been allocated to the cell. Channels that can be used by a cell but are not allocated to it, have a non-allotted status.

These three functions are described below. Note that the algorithm description assumes that the channelized system is a purely TDMA (Time Division Multiple Access) system. Moreover, in that TDMA context, the term "active channel" denotes a TDMA channel with at least one conversation on it. This algorithm will also be applicable to Global System for Mobile (GSM) systems, which represent a combination of FDMA and TDMA. A modification of the algorithm required for an analog or mixed system will be apparent to those skilled in the art.

(a) Channel Acquisition Function

The Channel Acquisition Function is described in Table 1 below. It is invoked when a call is started or handed off.

Table 1 "Channel Acquisition Logic"

1. Assign channel request to an active "allotted" channel with an idle time slot, if one exists. If none exists, go to 2.

2. With a probability p go to 3, and (1–p) to 6 [where p is a positive number less than or equal to one; p may be assigned different values depending on traffic conditions].

3. Assign channel request to an active "non-allotted" channel with an idle time slot, if one exists. If none exists, go to 4.

4. Check if there exists a free (i.e., "idle") "allotted" channel that can be assigned to the channel request. The following condition must be met:

a. Channel S/I Test: S/I requirements must be satisfied for an assignment to take place.

5. If such a channel exists, assign it to the channel request and terminate. Otherwise, go to 9.

6. Check if there exists a free "allotted" channel that can be assigned to the channel request. The following condition must be met:

a. Channel S/I Test: S/I requirements must be satisfied for an assignment to take place.

7. If such a channel exists, assign it to the channel request and terminate.

8. Otherwise assign channel request to an active "non-allotted" channel with an idle time slot, if one exists. If none exists, go to 9.

9. Check if there exists a free "non-allotted" channel that can be assigned to the channel request. The following conditions must be met:

a. Cell Reservation Test: The owner cell meets the reservation requirement.

b. Channel S/I Test: S/I requirements must be satisfied for an assignment to take place.

10. If such a channel exists, assign it to the channel request and terminate.

11. Otherwise, the channel request is denied.

Note that when a bit-error-rate criterion is used to determine admissibility of a channel assignment, the Channel S/I test is replaced by a BER test.

(b) Channel Release Function

The Channel Release Function is needed only if the algorithm permits channel re-arrangements. It is invoked whenever a call served by an "allotted" channel terminates or is handed off. The vacated time slot will be filled with a call served by a "borrowed" channel, provided that the latter will be free of calls after the channel re-arrangement. Otherwise, no re-arrangement takes place. The logic of the function is given in Table 2.

Table 2. Channel Release Logic

1. Find a "borrowed" channel with the fewest busy time slots, s.
2. If none exists, terminate. Otherwise go to 3.
3 If s is equal to 1, go to 5.
4. Otherwise, check if there are enough vacant time slots in other "allotted" channels in the cell to carry all the calls on the selected "borrowed" channel.
5. Check if the selected "borrowed" channel meets the following requirements:
  a. Channel Re-arrangement Test: The channel re-arrangement restrictions are met for the calls on the "borrowed" channel.
  b. Channel S/I Test: S/I requirements must be satisfied if the call(s) is (are) transferred to the released channel (and the additional "allotted" channels selected).
6. If the above requirements cannot be satisfied, eliminate the selected "borrowed" channel from consideration, and repeat step 1.
7. If no "borrowed" channel exists that can satisfy the above requirements, terminate.
8. Otherwise, transfer the call(s).

Note that when a bit-error-rate criterion is used to determine admissibility of a channel assignment, the Channel S/I test is replaced by a BER test.

(c) Channel (Re-)Allocation Function

The Channel (Re-)Allocation Function finds the way channels should be allocated in the system. In an illustrative embodiment of the invention, channels are selected so that the number of channels allocated to each cell or sector is proportional to the number of channels needed, and their ratio is maximum. The number of channels needed is calculated based on the desired blocking and call-drop probabilities. S/I ratio requirements are satisfied by the new channel allocation. The data used by this function consists of the traffic load and serving signal and interference statistics.

VIII. Solution of Channel Reallocation Problem

An optimal method for solving the non-regular channel allocation problem is described below. It should be understood, however, that the ADCA Algorithm described herein can be used with other channel allocation methodologies.

To state the channel allocation problem algebraically, the following notation is utilized. Let

| | |
|---|---|
| $j = 1, \ldots, J$ | index of different logical cells (A logical cell is the portion of the coverage area of a cell served by a logical face.) |
| $i = 1, \ldots, J$ | same as j (the combination (i,j) designates a pair of logical cells) |
| $y_j$ | number of channels needed in logical cell j to meet blocking requirements | requirements

| | |
|---|---|
| N | number of available channels |
| $I_{ij}$ | co-channel interference contribution by logical face i to logical cell j |
| $S_j$ | signal strength of logical face j |
| T | threshold level of the signal-to-interference ratio |

The unknown quantities of the problem are:

| | |
|---|---|
| g | capacity factor (bottleneck capacity ratio) |
| K | number of channel sets |
| $N_k$ | size of channel set k |
| $x_{kj}$ | $\begin{cases} 1 & \text{if logical cell j is covered by channel se} \\ 0 & \text{otherwise} \end{cases}$ |

The channel allocation can be expressed as a mathematical programming problem of the form: Maximize g Subject to: $\sum_k x_{kj} N_k \geq y_i g$ for $j = 1, \ldots, J$ (1)

$$\sum_k N_k \leq N \quad (2)$$

$$\text{Prob}\left[ \sum_{i \neq j} I_{ij} x_{ki} \leq \frac{S_j}{T} + M(1 - x_{kj}) \right] \geq 1 - \alpha \quad (3)$$

for $j = 1, \ldots, J; k = 1, \ldots, K$
$x_{kj} = 1, 0$
$N_k \geq 0$, integer where M is a large positive number The constraints in (1) allocate channels to logical cells in proportion to the cells' requirements. In constraint (2) the total number of assigned channels is limited to the number of channels available. Constraint (3) ensures that the ratio of signal strength to co-channel interference is above the desired threshold value with confidence level $1-\alpha$. The above formulation of the channel allocation problem can accommodate additional constraints that would reflect a user's special needs. Examples of such constraints are discussed hereinbelow in a discussion of the solution procedure for the basic formulation.

The above problem is a large scale nonlinear mixed-integer stochastic mathematical program. If, for example, a cellular grid has 210 logical cells (70 cell sites, with 3 logical faces per cell site), and 200 channel sets are considered, there would be 42,211 constraints and 42,200 integer variables (excluding slack variables), of which 42,000 would be binary.

In accord with the principles of the invention, this problem is decomposed into two computationally tractable parts using generalized linear programming. The original problem is decomposed into two smaller problems which are solved one after the other in an iterative sequence, exchanging their respective solutions, until the optimal solution is reached. Following established convention, the two problems are called the Master Program and the Subprogram. The Master Program consists of all but the stochastic constraints in (3), which make up the Subprogram constraints.

The algebraic formulation of the Master Program and Subprogram are expressed as follows. The following expressions define the Master Program of block 420 subsequently discussed with respect to FIG. 6:

Maximize g

Subject to: $\sum_{\text{all available } k} x_{kj} N_k \geq y_i g$ for $j = 1, \ldots, J$ (4)

$$\sum_{\text{all available } k} N_k \leq N \quad (5)$$

$N_k \geq 0$, integer where $x_{kj}$ are constants satisfying the co-channel interference conditions. These values are supplied by the Subprogram described below.

The Subprogram contains the constraints assuring that the ratio of signal strength to co-channel interference is above a desired threshold value. Its objective coefficients are the simplex multipliers corresponding to constraints (4) of the Master Program. The Subprogram has the following form:

$$\text{Maximize } v = \sum_j \lambda_j x_j \quad (6)$$

Subject to:

$$\text{Prob}\left[\sum_{i \neq j} I_{ij} x_i \leq \frac{S_j}{T} + M(1 - x_j)\right] \geq 1 - \alpha \text{ for } j = 1, \ldots, J$$

$$x_j = 1, 0$$

where $\lambda_j$ is the simplex multiplier corresponding to the $j^{th}$ constraint in (4).

The collection of channel sets included in the Master Program is comprised of all the solutions of the Subprogram. The $k^{th}$ solution of the Subprogram provides values for the binary variables $x_{kj}$. A channel set is defined in terms of the co-user cells it serves. The collection of channel sets grows with every new solution of the Subprogram, and this growth helps improve the Master Program solution. Growth in the collection of channel sets stops when the optimal solution is reached.

Figure 6:
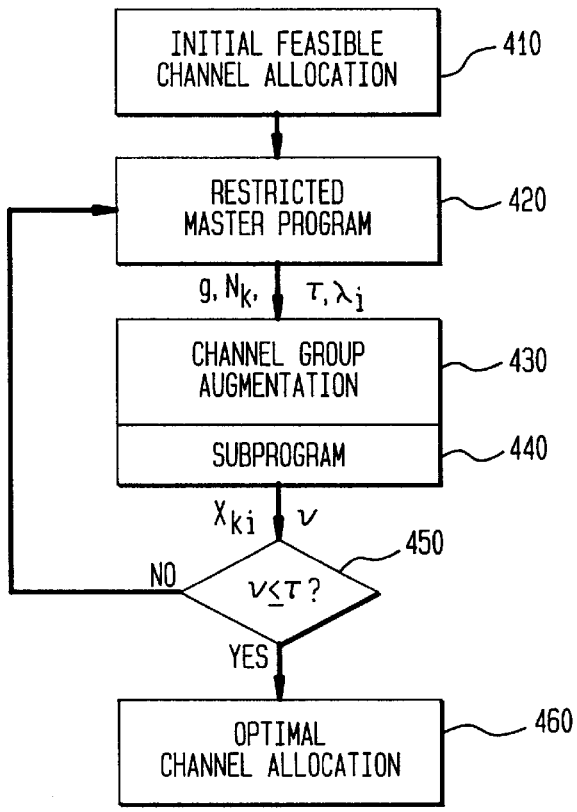
FIG. 6 is a flow process diagram of a method for allocating channels to various cells of a wireless/cellular radiotelephone system.

The overall structure of the allocation process comprising the Master Program and Subprogram is shown in the FIG. 6. The solution procedure, as shown in the flow process in FIG. 6, involves four major functions. These are: Channel Allocation Initialization (block 410), a Master Program Solution (block 420), Channel Set Augmentation, and Subprogram Solution (closely related blocks 430 and 440). In the first function, block 410, which is the initialization of the channel allocation, a feasible channel allocation is obtained before we proceed with the optimization. If the model is applied to an existing grid, the present channel allocation can serve as the initial channel allocation, provided it satisfies all system constraints. If it violates any of the constraints, it is modified by the Initial Channel Allocation algorithm, as described below, to meet all constraints.

Once an initial feasible channel allocation has been obtained, the remaining three functions are executed in an iterative sequence. First comes the solution of the Master Program in block 420, whose solution furnishes the system values of g, $N_k$, $\tau$, and $\lambda_j$. $\tau$ is a simplex multiplier corresponding to constraint (5) and $\lambda_j$ is a simplex multiplier corresponding to the $j^{th}$ constraint in (4). This information is used by the Channel Set Augmentation algorithm in block 430 which invokes the Subprogram Solution algorithm in block 440 several times in order to generate new channel sets.

The Channel Group Augmentation algorithm is a heuristic process that enhances solution of the problem. It revises the values of $N_k$ and $\lambda_j$, which are used in the next solution of the Subprogram. The Subprogram solution furnishes the values of v and $x_{kj}$.

Once a specified number of channel sets has been generated, optimality is checked as prescribed in decision block 450. If the solution is optimal as determined in decision block 450, the algorithm terminates and the allocation is provided in block 460. Otherwise, the cycle repeats again with the solution of the restricted Master Program in block 420.

The following condition indicates optimality: Let K−1 be the current cycle, and let $x_{Kj}$ be the optimal solution of the new Subprogram. Let $\tau$ be the simplex multiplier corresponding to constraint (5) of the relaxed Master Program. If $$\sum_j x_{Kj} \lambda_j \leq \tau \quad (7)$$

then the current solution is optimal for the relaxed Master Program.

The solution procedure described herein is finite as the number of different channel sets is finite, and each solution of the Subprogram contributes a new channel set to the Master Program. That the channel set entering the Master Program at each cycle is new is based on the following observation. The simplex multipliers of the relaxed Master Program at cycle K−1 satisfy the conditions:

$$\sum_j x_{kj} \lambda_j - \tau \leq 0 \text{ for } k = 1, \ldots, K-1 \quad (8)$$

If the new Subprogram solution $x_{Kj}$ is added to the Master Program, it cannot meet the condition in (7), for that would lead to the termination of the process. Since it violates the requirement in (7) it cannot be identical to any of the K−1 solutions encountered previously, by condition (8). Hence, $x_{Kj}$ represents a new channel set. Given that the number of cells in a grid is finite, the number of distinct cell groupings that represent different channel sets is also finite. Hence, the solution procedure is finite.

The solution procedure must start with a feasible channel allocation that is a channel allocation that covers all cells and meets the channel availability constraint and co-channel interference constraints. For an existing cellular grid, the channel allocation in place may serve as the initial channel allocation provided it is feasible. If the existing channel allocation is not feasible (infeasibility would arise typically from the violation of the interference constraints), or if there is no existing channel allocation, it is necessary to generate an initial feasible channel allocation.

Figure 7:
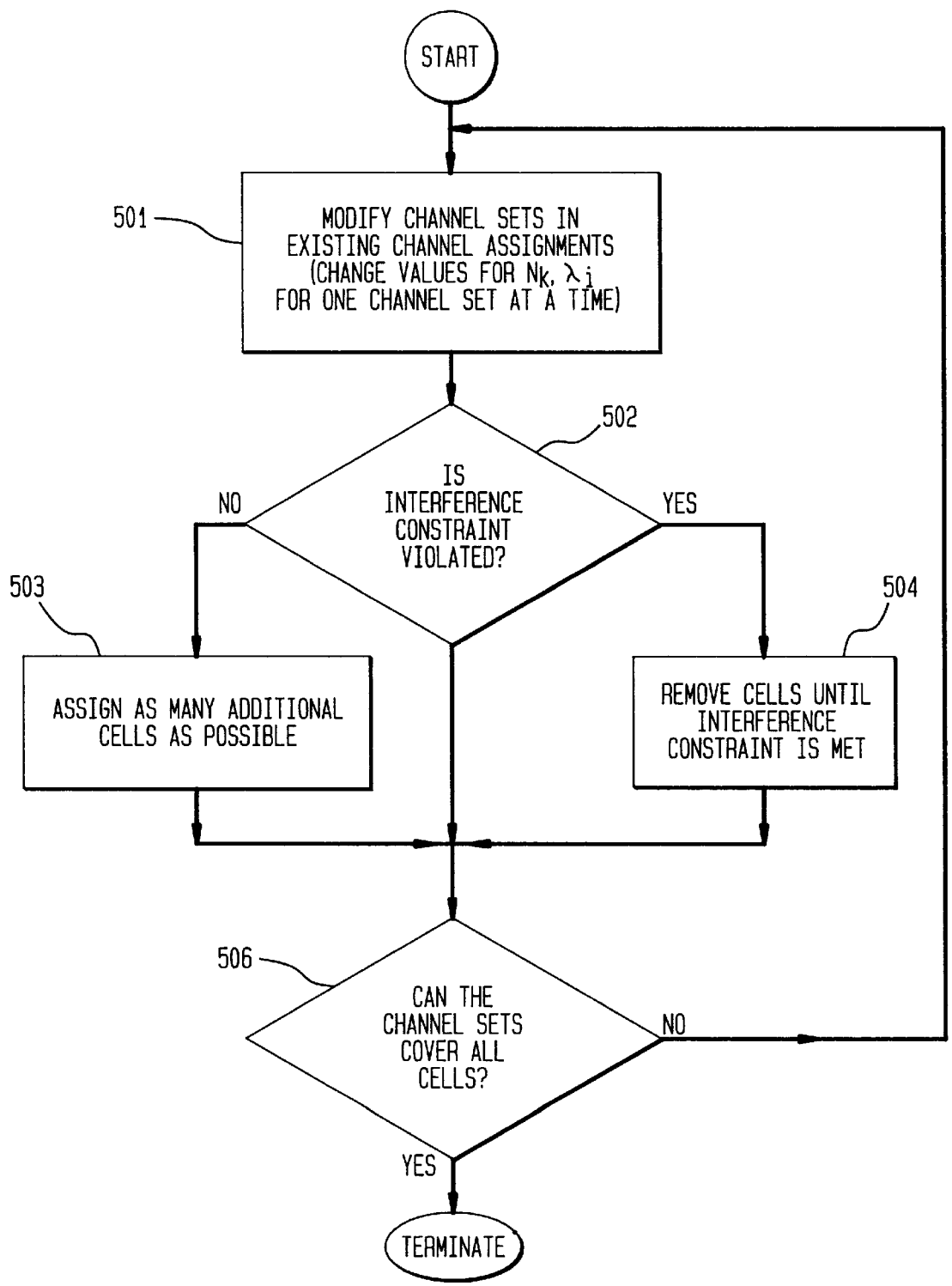
FIG. 7 is a flow process diagram of a method for making initial feasible channel allocations.

The method for deriving an initial channel allocation is based on a variation of the Channel Group Augmentation algorithm. In the most general case, as shown in FIG. 7, the existing channel allocation violates the interference constraints. In this case, Channel Assignment Initialization consists of two phases. In Phase I we modify (Block 507) the channel sets in the existing channel allocation, one at a time by changing values for $N_k$ and $\lambda_j$. If a channel set violates the interference constraint (decision Block 502), cells are removed (Block 504) until it satisfies the interference constraint. If the interference constraint is met by an existing channel set, the algorithm will assign as many additional cells as possible (Block 505), provided that the interference constraint is satisfied. If the resulting channel sets cannot cover all cells, the second phase is implemented. In Phase II additional channel sets are generated until all cells are covered (Block 506).

Both phases employ the Channel Set Augmentation algorithm. They differ in terms of the initial values used for $\lambda_j$. In Phase I, $\lambda_j$ equals 1 for all cells j covered by the existing channel set, and zero for the remaining cells. In Phase II, $\lambda_j$ is computed by the equation (10) disclosed herein below.

The Master Program is a linear program involving the integer variables $N_k$, which assume values ranging from 0 to N—the number of available frequencies, a number which is normally between 300 and 400. Given the magnitude of the integer variables, one can obtain near-optimal solutions to this mixed-integer linear program by solving the relaxed linear program without the integer requirements as per Block 601 in FIG. 8. For the purposes of channel allocation, integer solutions must be provided.

Figure 8:
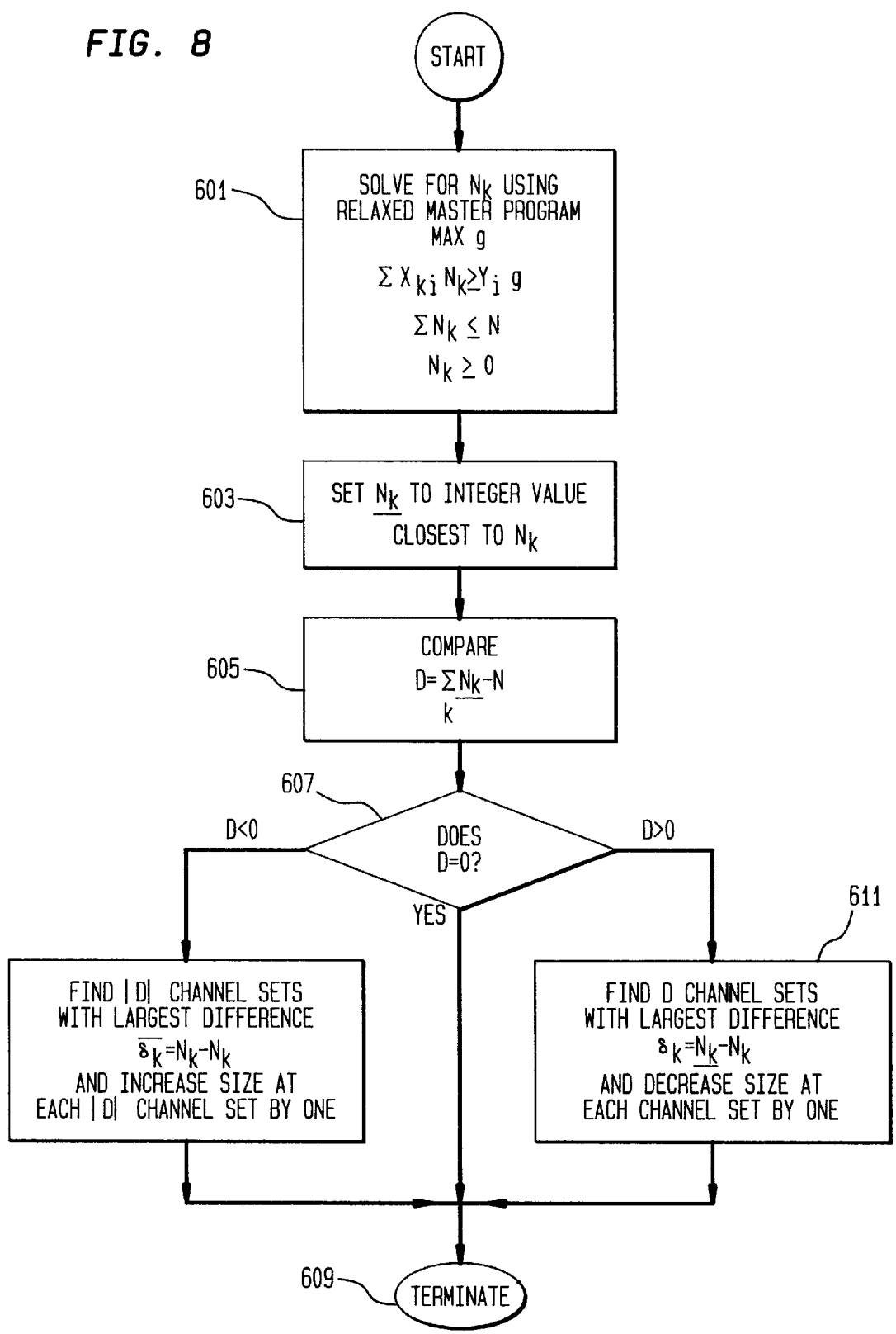
FIG. 8 is a flow process diagram of a method for providing an integer solution for the Master Program.

The algorithm yielding an integer solution to the Master Program shown in FIG. 8 uses the fact that the optimal channel allocation will use all of the N available channels. Given an optimal solution to the relaxed problem (the linear program without the integer requirements), the algorithm starts by making the channel set sizes equal to the integers closest to the relaxed solution (Block 601). It terminates if the integer set sizes add up to N (Blocks 605, 607, 609). If not, it increases (or decreases) by 1 the sizes of the channel sets with the greatest positive (or negative) deviation from the optimal non-integer value (Blocks 611, 615). The steps of the algorithm are shown in the FIG. 8 and are described below in detail.

The term $N_k$ denotes the channel set sizes in the optimal solution, and by $\underline{N_k}$ their closest integers. The procedure for obtaining an integer solution to the Master Program is outlined in FIG. 7 as follows:

Step 1 Set $\underline{N_k}$ equal to the integer closest to $N_k$. (Block 603)

Step 2 Compute the difference $D=\Sigma_k \underline{N_k}-N$. (Block 605)

If D=0, terminate (Block 607). Otherwise go to Step 3.

Step 3 If D<0, go to Step 5. Otherwise go to Step 4. (Block 607)

Step 4 Find D channel sets with the largest difference $\delta_k=\underline{N_k}-N_k$ Decrease the size of each of the D channel sets by 1.

Terminate. (Blocks 611, 613)

Step 5 Find |D| channel sets with the largest difference $\overline{\delta}_k=N_k-\underline{N_k}$.

Increase the size of each of the |D| channel sets by 1.

Terminate. (Blocks 615, 617)

It is easy to verify that, given a non-negative solution to the relaxed linear program, the resulting integer solution will also be non-negative.

Once the complexity caused by the integer constraints has been removed, the solution of the Master Program becomes straightforward. Standard linear programming software can be used. By linear programming standards, the relaxed Master Program is a relatively small linear program, having a number of constraints equal to one plus the number of logical cells in the grid, and number of variables equal to one plus the number of channel groups. It is expected that a large grid would have no more than 500 logical cells. Seven hundred and fifty channel sets would more than exceed the number needed to yield an optimal solution.

The number of cycles of the Master Program is reduced by generating lists of channel sets with the channel group augmentation heuristic. One of the factors contributing to the computational effort in mathematical programming decomposition is the repeated solution of the Master Program. Since the optimal channel allocation is derived from the last Master Program solution, and all previous Master Programs serve only to generate a list of desirable candidate channel sets, generating a larger number of candidates at each cycle would tend to reduce the number of Master Program solutions while still yielding an optimal solution. Therefore, between any two consecutive solutions of the Master Program, the method used generates several new channel sets. The number to be generated is specified by the user.

The criterion used in generating new channel sets is that they must have the potential to improve the Master Program objective value. The first channel set generated after the solution of the $K_{th}$ Master Program has this potential since it has a negative reduced cost by condition (7). In order to obtain heuristically additional channel sets with a negative reduced cost, the simplex multiplier $\lambda_j$ is needed. Typically, $\lambda_j$ is supplied by the solution of the Master Program. Since our aim is to generate more than one channel set between consecutive solutions of the Master Program, it is necessary to revise the $\lambda_j$ values before each Subprogram solution without re-solving the Master Program.

The revision of $\lambda_j$ is based on properties that would hold if the Master Program were solved. They are derived from the following Complementary Slackness conditions defined by equation (9):

$$\lambda_j \left( \sum_{k=1}^{K} x_{kj}N_k - y_ig \right) = 0 \text{ for } j = 1,\ldots,J \quad (9)$$

A consequence of the above conditions is that the simplex multiplier $\lambda_j$, which is required to be non-negative, will be positive only if the corresponding primal constraint in equation (1) is binding or, equivalently, whenever the capacity ratio of cell j equals the grid capacity factor. We refer to such a cell as a binding cell.

The condition of equation (9) is employed to update the $\lambda_j$ values of binding cells as follows. A new channel set K, derived from the last Subprogram solution, will receive in the next iteration a portion of the available channels. This implies that if set K covers cell j, cell j will typically not be binding in the next iteration. By equation (9), the corresponding simplex multiplier $\lambda_j$ would become zero. Hence, the following revision rule is used:

$$\lambda_j = \begin{cases} 0 & \text{if } x_{Kj} = 1 \\ \text{unchanged} & \text{if } x_{Kj} = 0 \end{cases} \quad (10)$$

This revision causes channel sets generated by subsequent solutions of the Subprogram to favor binding cells that were not covered by the last channel set, as they will have positive $\lambda_j$ values.

The above revision rules deal with the binding cells as they become non-binding. Rules are needed also for the cells that are not binding in the Master Program solution but, as new channel sets are added, may become binding. Such cells should be covered by subsequent channel sets. With $\lambda_j$ assigned zero value by equation (9), however, they do not have a chance, unless $\lambda_j$ is updated. An alternative way is to communicate to the Subprogram the binding status of a cell by handing over the new channel set sizes $N_k$. The Subprogram considers the binding status of a cell together with simplex multiplier $\lambda_j$ values in deriving a new channel set.

There are several ways to revise $N_k$. In this implementation of the algorithm we assume that the new channel set K will receive one $K^{th}$ of the available channels, while the size of the existing K−1 channel sets will be adjusted accordingly. That is, $$N_K = \frac{N}{K} \quad (11)$$

If the existing channel sets had size $N'_k$, their new sizes will be $$N_k = N'_k \frac{(K-1)}{K} \text{ for } k = 1,\ldots,K-1 \quad (12)$$

Figure 9:
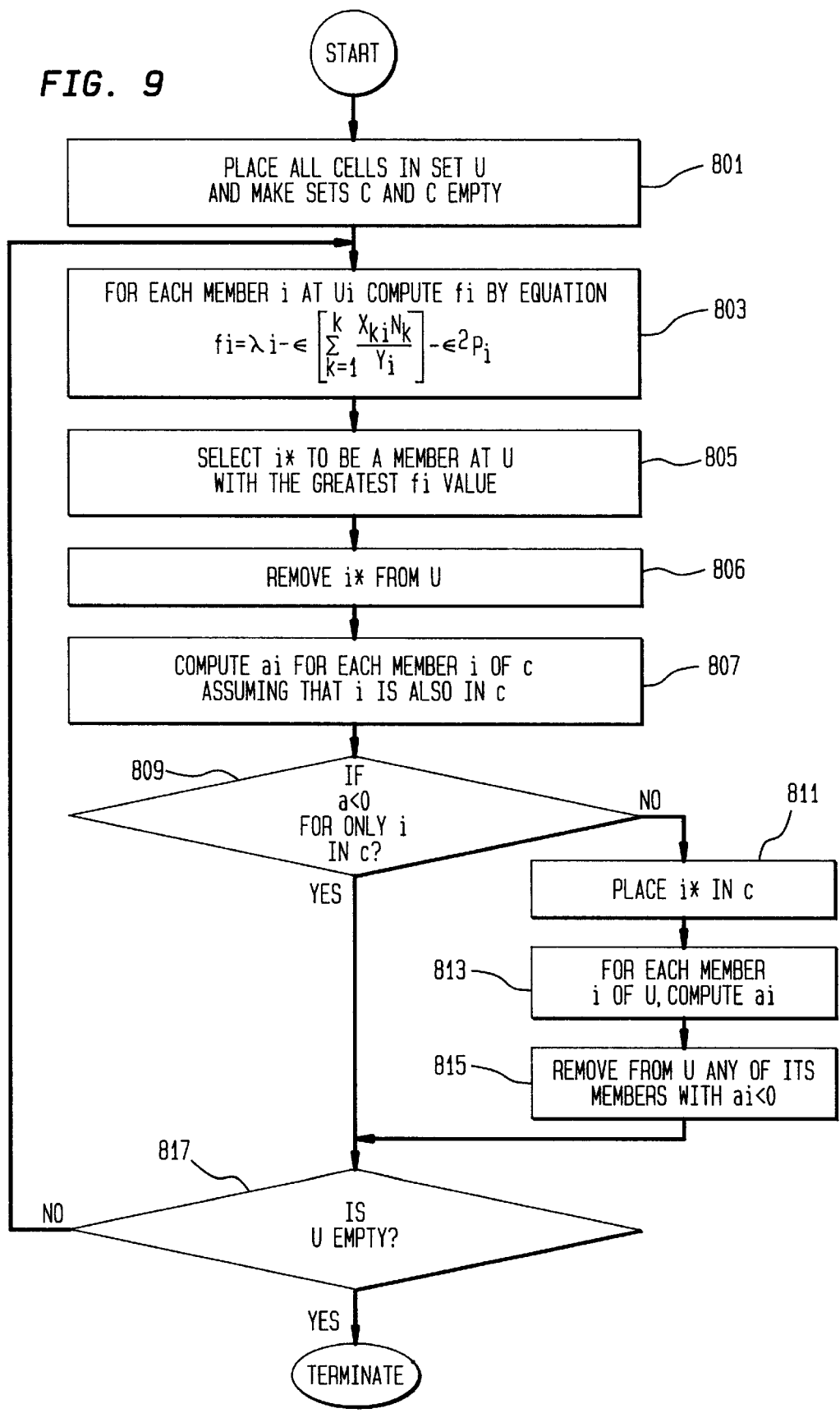
FIG. 9 is a flow process diagram of a method for channel set augmentation.

The algorithm for generating F new channel sets is shown in flow form in FIG. 9.

Step 1 Set $\lambda_j$ and $N_k$ equal to the values obtained by solving the Master Program. (Block 701)

Step 2 Repeat Steps 3 through 6, F times. (Blocks 702, 713)

Step 3 Solve the Subprogram to obtain $x_{kj}$. (Block 704)

Step 4 Revise $\lambda_j$ by equation (10). (Block 705)

Step 5 Compute $N_K$\$ by equation (11) (Block 709), and revise $N_k$ for $k=1,\ldots,K-1$ by equation (12). (Block 711)

Step 6 Increment K. (Block 711)

Given the difficulty of pursuing a globally optimal solution method, we have devised an efficient heuristic algorithm for the solution of the Subprogram. It constructs a solution by selecting among the cells in the grid those that will maximize the Subprogram objective value without violating the interference constraints of equation (6). Such a set is constructed by adding one cell at a time, giving priority to the cells with the greatest $\lambda_j$ value. A cell can be added to the set if it does not interfere with the cells already in the set. For cells with equal $\lambda_j$ values the order in which cells are considered is important because the inclusion of one cell might preempt, through the interference it generates, more cells than another. Preference is given to cells with low preemptive potential. The preemptive potential would change at each step, as new cells are added to the set. Therefore, the criterion function used for including a cell in the solution is updated after the addition of each cell.

The algorithm logic can be described as follows. At each step, the cells are partitioned into three subsets. The set C, which consists of the cells included in the solution (i.e., $x_j=1$); the set $\bar{C}$, which consists of the cells excluded from the solution (i.e., $x_j=0$); and the set U, which consists of the cells whose fate has yet not been determined. At the start of the algorithm, U contains all the cells, and C and $\bar{C}$ are empty. At each step a member of U is placed in C. Its inclusion in the solution may pre-empt other members of U from inclusion. The preempted members of U are moved to $\bar{C}$. The algorithm terminates when U becomes empty.

Among cells with equal $\lambda_j$ values, the cell to be moved from U to C is chosen based on its potential to block other members of U from entering C. There are several ways to measure this potential. In the implementation described in this paper we define the preemptive potential function $p_j$ as the inverse of the "slack" $a_j$ in the interference constraint in equation (6), which measures the margin for additional contributions to the interference experienced in cell j.

$$p_j = \frac{1}{a_j} \quad (13)$$

The solution of the Subprogram is expanded to include cells with zero $\lambda_j$. This is necessary in order to deal with the non-binding cells that become binding as more channel sets are generated. Moreover, the inclusion of the largest possible number of cells in the solution of the Subprogram is desirable for the increased system planning flexibility it affords. Hence, cells are chosen in order of descending value of the following criterion function $f_j$:

$$f_j = \lambda_j - \epsilon \left[ \frac{\sum_{k=1}^{K} x_{kj} N_k}{y_j} \right] - \epsilon^2 p_j \quad (14)$$

where K is the last channel set generated, and $\epsilon$ is a very small positive number.

Given a sufficiently small value for $\epsilon$, the cells with positive $\lambda_j$ values will be given priority. The remaining cells will be considered only when all cells with positive $\lambda_j$ have been considered. Among cells with positive and equal $\lambda_j$ values, the choice of a cell to be included in set C is based on the preemptive potential $p_j$ since, according to condition (9), the capacity ratio in the second term of (14) is the same for all such cells—it equals the grid capacity factor. For cells with zero $\lambda_j$ values, the capacity ratio dominates the choice of a cell to be included into C.

Figure 10:
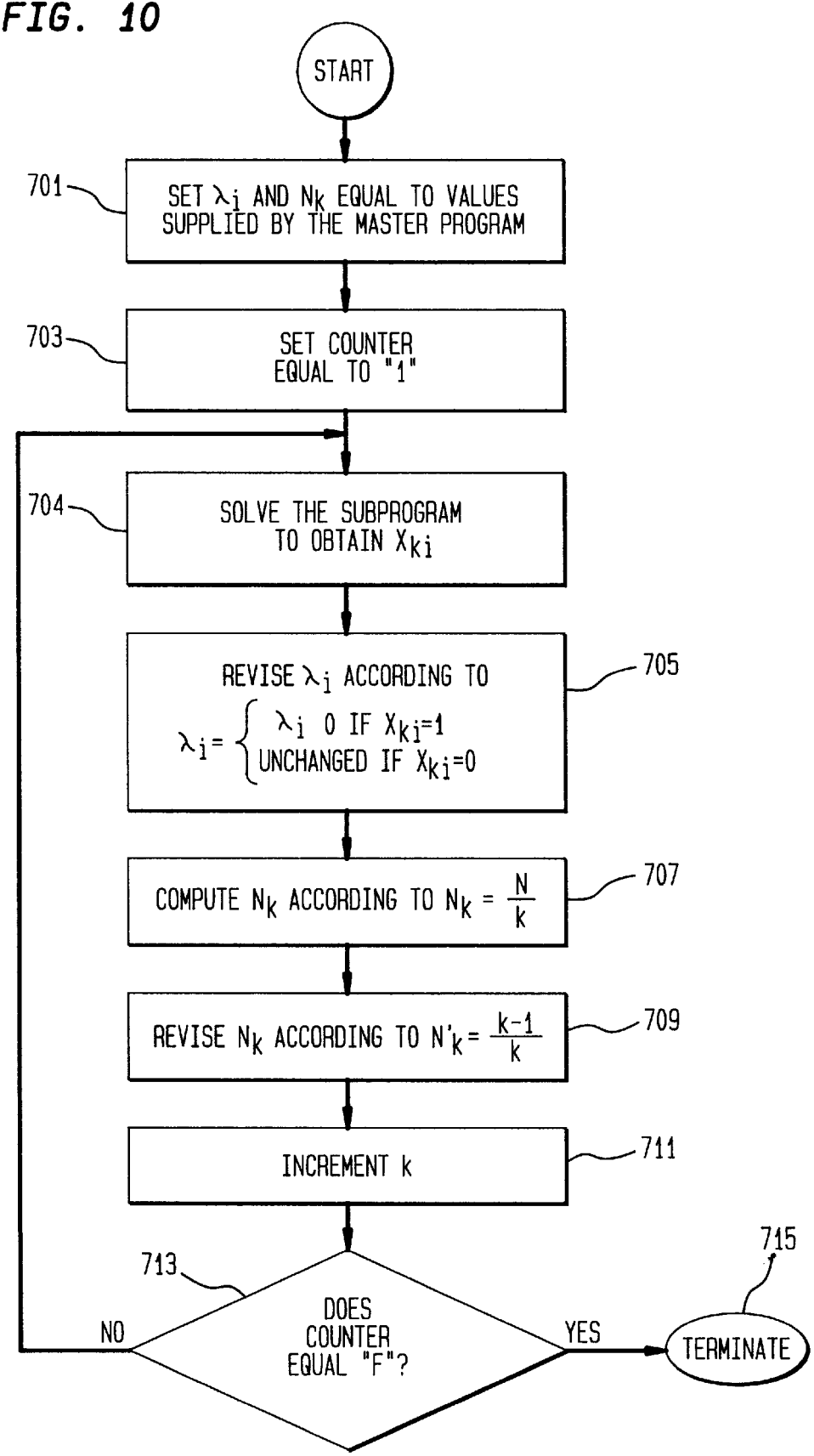
FIG. 10 is a flow process diagram of a method for solution of the Subprogram.

The algorithm for the solution of the Subprogram is shown in flow process form in FIG. 10.

Step 1   Place all cells in set U, and make sets C and $\bar{C}$ empty. (block 801)
Step 2   For each member j of U, compute $f_j$ by equation (14). (block 803)
Step 3   Select j * to be the member of U with the greatest $f_j$ value. (block 805)
         Remove j * from U. (block 806)
Step 4   Compute $a_j$ for each member j of C assuming that j * (block 807) is also in C.
Step 5   If $a_j < 0$ for any j in C, place j * in $\bar{C}$ and go to Step 8. (block 809)
         Otherwise, place j * in C (block 811) and go to Step 6.
Step 6   For each member j of U compute $a_j$. (block 813)
Step 7   Remove from U any of its members j with $a_j < 0$ and place them in $\bar{C}$. (block 815)
Step 8   If U is empty, terminate. (block 817) Otherwise, go to Step 2.

The calculation of the preemptive potential $p_j$ in the solution of the Subprogram, discussed above, involves the interference constraint slack $a_j$, which measures the margin for additional contributions to the interference experienced in cell j. The slack will vary with the composition of C, the collection of cells covered by the channel set.

To compute the slack $a_j$ we convert the probability statement of equation (6) into an equivalent deterministic constraint for each cell j in U, the collection of undetermined cells. The constraint in equation (6) can be written as follows:

$$\text{Prob}\left[ \frac{S_j}{\sum_{i \neq j, \in C} I_{ij}} \geq T \right] \geq 1 - \alpha \text{ for } j \in U \quad (15)$$

To write the above as an equivalent deterministic inequality, we need to know the probability distribution of the signal-to-interference ratio. Let Y be the value of this ratio, expressed in decibels. That is, $$Y = 10 \log_{10} \left[ \frac{S_j}{\sum_{i \neq j, \in C} I_{ij}} \right] \quad (16)$$

Following other treatments, we assume that Y is normally distributed. Let $\mu_Y$ and $\sigma_Y^2$ be the mean and variance of Y, respectively, and let R be the signal-to-interference ratio threshold value T expressed in decibels. Equation (15) can be written as follows:

$$\text{Prob}[Y \geq R] = 1 - \text{Prob}\left[ z \leq \frac{R - \mu_Y}{\sigma_Y} \right] \geq 1 - \alpha \text{ for } j \in U \quad (17)$$

where z is a normal random variable. The equivalent deterministic constraint is the following:

$$\mu_Y + z_\alpha \sigma_Y \geq R \quad (18)$$

where $z_\alpha$ is the $\alpha$-quantile of a normal random variable. $a_j$ is the slack variable of the above inequality. Therefore, $$a_j = \mu_Y + z_\alpha \sigma_Y - R \quad (19)$$

The values of $\mu_Y$ and $\sigma_Y$ depend on the composition of set C. In this example, they are computed using the assumption that the signals of all antenna faces, when expressed in decibels, are independent normally distributed random variables and that the cumulative interference experienced in cell j is also normally distributed, when expressed in decibels [9]. Let $$Y = P - L \quad (20)$$

where $$L = 10 \log_{10} \left[ \sum_{i \neq j, \in C} I_{ij} \right] \quad (21)$$

$$P = 10 \log_{10} S_j \quad (22)$$

If $\mu_L$ is the mean of the cumulative interference L in cell j, expressed in decibels, $\sigma_L^2$ is the variance of L, $\mu_P$ is the mean of the power signal P in cell j, expressed in decibels and $\sigma_p^2$ is the variance of P, then the mean and variance of Y are given by:

$$\mu_Y = E(Y) = E(P) - E(L) = \mu_p - \mu_L \quad (23)$$

$$\sigma_Y^2 = Var(Y) = Var(P) + Var(L) - 2cov(P,L) = \sigma_p^2 + \sigma_L^2 - 2cov(P,L) \quad (24)$$

$\mu_P$, and $\sigma_p^2$ may be calculated from analytical models or estimated based on empirical data, which may accumulate during the operation of the system. $\mu_L$, $\sigma_L^2$, and cov(P,L), which vary with the composition of the set C, are computed in each step of the Subprogram Solution algorithm by a power-summing procedure. The statistical parameters employed in the power summing computation may be calculated from analytical models, or estimated based on empirical data that may accumulate during the operation of the system.

IX. Conclusion

Herein has been described a novel system and method for the allocation of radio frequency (RF) spectrum channels to the different cells within a cellular system and the assignment of allocated and non-allocated channels to a channel request within a cell, for optimizing utilization of the available overall radio spectrum. Although the present embodiment of the invention has been described in detail, it should be understood that various changes, alterations and substitutions can be made therein without departing from the spirit and scope of the invention as defined by the appended claims. In particular, it should be noted that while the described embodiments of the invention have generally been characterized in terms of frequency assignments in analog systems, it is to be understood that the same techniques may be applied to code assignments in CDMA systems and time slot assignments in TDMA systems, as well as to GSM systems. They will also be applicable to hybrids of two or more of such systems. It should be understood as well that the methodology of the invention will also be applicable to micro-cellular systems, including intra-building systems.

I claim:

1. In a wireless communications system having service areas partitioned into a plurality of substantially contiguous cells, a method of assigning radio channels to said cells comprising the steps of:

determining an initial allotment of an available channel set among said plurality of cells based on an established set of traffic and interference data;

measuring traffic and interference data for said cells on a substantially real-time basis, said measure traffic data including at least blocking and signal-to-interference (S/I) data for a given channel;

periodically reallocating channels among said plurality of cells based on said measured traffic and interference data; and dynamically adjusting said channel allotment during intervals between said periodic reallocation of channels based on contemporaneously measured traffic and interference data.

2. In a wireless communications system having service areas partitioned into a plurality of substantially contiguous cells, the method of assigning radio channels to said cells of claim 1 wherein said step of dynamically adjusting said channel allotment includes the further steps of:

determining if, upon arrival of a new channel request, a cell has exhausted an assigned allocation of channels;

determining if a free channel exists, among channels allocated to said cell, that would meet interference and system constraints if assigned to said new channel request, given current use of said channel;

determining if a free channel exists, among channels not allocated to said cell, that would meet interference and system constraints if assigned to said new channel request, given current use of said channel;

assigning said request to said free channel meeting interference and system constraints.

3. In a wireless communications system having service areas partitioned into a plurality of substantially contiguous cells, the method of assigning radio channels to said cells as claimed in claim 2, including the further steps of:

determining, for a cell potentially able to provide one or more channels from its channel allocation (hereafter "donor cell") to another cell requesting a non-allocated channel (hereafter "requestor cell"), a portion of said donor cell's allocated channels to be reserved for said donor cell's own use;

determining, at said arrival of said new channel request, whether said donor cell has available said reserved portion before allowing said free channel to be borrowed by said requester cell.

4. In a wireless communications system having service areas partitioned into a plurality of substantially contiguous cells, the method of assigning radio channels to said cells as claimed in claim 3, wherein said step of determining a portion of said donor cell's allocated channels to be reserved for said donor cell's own use is carried out in real time as a function of system performance.

5. In a wireless communications system having service areas partitioned into a plurality of substantially contiguous cells, the method of assigning radio channels to said cells as claimed in claim 2, comprising the further steps of:

determining if a channel released at a call termination is other than a borrowed channel; and transferring an existing call on a borrowed channel to a non-borrowed released channel.

6. In a wireless communications system having service areas partitioned into a plurality of substantially contiguous cells, the method of assigning radio channels to said cells as claimed in claim 2, wherein, upon an allocated channel becoming available in a cell, a channel assignment for a non-allocated channel in said cell is released and a call using said channel assignment transferred to said available allocated channel (hereafter "channel rearrangement"), and comprising the further step of:

prohibiting said channel rearrangements in excess of a pre-determined number per call.

7. In a wireless communications system having service areas partitioned into a plurality of substantially contiguous cells, the method of assigning radio channels to said cells as claimed in claim 2, wherein, upon an allocated channel becoming available in a cell, a channel assignment for a non-allocated channel in said cell is released and a call using said channel assignment transferred to said available allocated channel (hereafter "channel rearrangement"), and comprising the further step of:

establishing a minimum time interval between consecutive occurrences of said channel rearrangements for a given call.

* * * * *